US006617960B1

(12) United States Patent
Fischer et al.

(10) Patent No.: US 6,617,960 B1
(45) Date of Patent: Sep. 9, 2003

(54) ARRANGEMENT FOR CONTROLLING ACCESS OF PERSONS, AND ACCESS TERMINAL

(75) Inventors: Josef Fischer, Hallein-Rif (AT); Wolfram Kocznar, Innsbruck (AT); Hans-Peter Heller, Falstenau (AT)

(73) Assignee: TeamAxess Ticketing GmbH, Koppl (AT)

( * ) Notice: Subject to any disclaimer, the term of this patent is extended or adjusted under 35 U.S.C. 154(b) by 0 days.

(21) Appl. No.: 09/251,255

(22) Filed: Feb. 16, 1999

(30) Foreign Application Priority Data

| | | |
|---|---|---|
| Feb. 18, 1998 | (AT) | 291/98 |
| Oct. 1, 1998 | (AT) | 645/98 U |
| Oct. 7, 1998 | (AT) | 657/98 U |
| Oct. 7, 1998 | (AT) | 658/98 U |
| Nov. 19, 1998 | (AT) | 776/98 U |
| Jan. 19, 1999 | (AT) | 31/99 U |

(51) Int. Cl.[7] .................... G05B 19/00

(52) U.S. Cl. .................... 340/5.7; 340/5.1; 340/5.2; 340/5.61; 340/5.24; 340/5.5; 49/46; 49/47; 235/382; 235/375

(58) Field of Search .................... 340/5.1, 5.2, 5.7, 340/5.61, 5.24, 5.5; 49/46, 47, 25; 235/382, 375; 109/2

(56) References Cited

U.S. PATENT DOCUMENTS

| | | | | |
|---|---|---|---|---|
| 3,701,100 A | * 10/1972 | Yarbrough | | 340/5.5 |
| 5,202,550 A | 4/1993 | Kocznar et al. | | |
| 5,333,410 A | * 8/1994 | Tetherton | | 49/25 |
| 5,565,857 A | * 10/1996 | Lee | | 235/375 |
| 5,615,622 A | * 4/1997 | Moses et al. | | 109/2 |
| 5,661,286 A | 8/1997 | Fujikoa | | |

FOREIGN PATENT DOCUMENTS

| | | |
|---|---|---|
| AT | 394 885 B | 7/1992 |
| DE | 195 41 634 A1 | 5/1986 |
| DE | 36 00 762 A1 | 8/1986 |
| DE | 43 08 193 A1 | 9/1994 |
| DE | 195 41 634 A1 | 5/1996 |
| EP | 428 233 A1 | 5/1991 |
| JP | 09198538 A | 7/1997 |
| JP | 10246041 A | 9/1998 |
| US | 5 202 550 A | 4/1993 |
| US | 5 661 286 A | 8/1997 |
| WO | WO 88/03295 A1 | 5/1988 |
| WO | WO 88/03296 A1 | 5/1988 |
| WO | WO 90/08875 A1 | 8/1990 |
| WO | WO 94/25939 A1 | 11/1994 |
| WO | WO 96/01459 A1 | 1/1996 |
| WO | WO 97/18379 A1 | 5/1997 |

* cited by examiner

*Primary Examiner*—Michael Horabik
*Assistant Examiner*—Yves Dalencourt
(74) *Attorney, Agent, or Firm*—Henry M. Feiereisen

(57) ABSTRACT

Apparatus for controlling access of persons, with access lanes adapted for the individual passage of these persons, with readers associated with the access lanes for access authorization and identification and/or blocking means for the persons, characterized in that between two adjacent access lanes (2,2') there is provided a control device (1), which includes—when viewed in the passing direction—the identification and/or blocking means (3,3') and the electronic components required for controlling these means, which are located to the left and to the right, respectively.

32 Claims, 2 Drawing Sheets

ARRANGEMENT FOR CONTROLLING ACCESS OF PERSONS, AND ACCESS TERMINAL

BACKGROUND OF THE INVENTION

The invention relates to an arrangement for controlling access of persons, in particular an arrangement with access lanes adapted for the individual passage of these persons.

Such arrangements that control access of persons are known, for example, for ski lifts and aerial tramways, but also for other places providing public access. Arrangements of this type are also used in buildings where access to the building is restricted to a specific group of persons. In most cases, access is provided in the form of access lanes which allow persons to pass one at a time. A barrier device is located inside the access lanes, wherein the barrier device is released after access authorization has been verified. Access authorization may be based on an electronic ticket that does not make physical contact, or on a magnetic card or a card with a bar code.

Typically, the barrier devices are implemented as turnstiles. Conventional turnstiles typically include three rods which are offset from each other by 120 degrees and secured to a shaft of the turnstile. Adjacent rods may enclose an acute angle with each other. When a person passes through the turnstile, the shaft is rotated by 120 degrees, so that the rod which originally extended into the passage lane, now lets the person pass, whereas the rod which before pointed towards the person passing through is now in the barrier position. The type of barrier where the rotation axis of the shaft is oriented at an acute angle to the passage plane, is generally referred-to as a turnstile. Turnstiles can adequately control the individual passage of persons, but are frequently viewed as inconvenient.

Another type of barrier arrangement includes a shaft which is oriented perpendicular to the passage plane, with the rods rotating in a horizontal plane. This arrangement provides improved comfort over the arrangement described above, but requires a fair amount of space equal to at least the width of a passing lane.

To make it easier for persons to pass through the turnstile, the shaft in both arrangements may be rotated by a motor. A turnstile having the first arrangement has been proposed, where the shaft has only a single rod which executes a 360 degree rotation for each passage. Since the drive torque applied by the motor must be small enough so as not to cause bodily injuries, the arrangement with a single rod may not be able to reliably provide access for one person at a time.

SUMMARY OF THE INVENTION

It is therefore an object of the invention to improve an access control arrangement of the type described above by providing more comfort for the user and a reliable access for one person at a time.

The invention provides an arrangement for controlling access of persons with access lanes adapted for the passage of these persons one at a time, wherein with each access lane there is associated a turnstile and a reader for access authorization. The turnstile includes a motorized shaft for rotation, wherein the axis of rotation is inclined at an acute angle with respect to the access plane. The shaft includes two rods which are offset relative to the axis of rotation by 180 degrees, for blocking the access lane. A respective one of these rods can be rotated from a blocking position where the rod extends into the passage lane, into a position where the rod points towards the ground in order to let a person pass through.

Arrangements of the type described above typically require mechanical and electronic components for each access lane. These components are arranged in separate devices located on the side of the access lanes. Separate additional devices are also required for the blocking means, which are most frequently implemented as turnstiles. Conventional arrangements disadvantageously require considerable space, and their appearance may make the user feel claustrophobic.

The invention overcomes these disadvantages by providing a single control device which is located between two adjacent access lanes. The identification and/or blocking means are arranged on the respective left and right side of the control device, as viewed in the passage direction. The control device may include two housing shells which form a floor support and may also receive the identification and/or blocking means. The housing shells may be symmetric and made of cast aluminum. Further advantages of the invention will be discussed below with reference to a specific embodiment.

Access is frequently authorized based on an electronic ticket which can operate without making physical contact. Such tickets may include a transponder with a transmitter/receiver which, after activation by an electromagnetic field in a reader, retransmits data. Known readers typically have an antenna formed as an air coil and arranged on the side of the access lane. The coil may also be routed inside a tubular frame. Alternatively, a pan with a plastic lid and made of cast aluminum may be provided. The air coil may then be supported by the plastic lid.

The antenna construction of these arrangements, however, is complex and may limit the range at which the tickets can be read. Moreover, the arrangement may make the user feel claustrophobic.

The invention overcomes these disadvantages by constructing each antenna—when viewed in the direction of access—of two spaced apart vertical pipes, with an electrically insulating plate extending between the pipes. A conducting loop forming a transmitter/receiver circuit is arranged behind the plate, as viewed from the access direction. This feature provides a sufficient reception range and at the same time may make the user feel less claustrophobic.

The tickets can be read reliably from one side by extending between the vertical pipes of the antenna a second plate which is remote from the first plate and at least partially electrically conducting.

It is also possible to implement an access control system without employing a turnstile or barrier, for example, for the purpose of statistically sampling the number of persons passing through or for optically indicating when access is authorized. With this type of access terminal, however, adjacent antennas from several access lanes may interfere with each other.

It is therefore also an object of the invention to mitigate these problems by providing an access control system that is less complex.

According to the invention, an access terminal has at least two antennas for reading RFID transponders without making physical contact with the transponders. The antennas are connected to common transmission/receiving electronics, wherein at any given time only one of the antennas is actively connected to the common transmission/receiving electronics via a multiplexer, while the inactive antennas are shorted, damped or detuned.

This approach reduces the complexity of the electronics and has the advantage that different antennas or access lanes no longer interfere with each other.

According to another advantageously feature of the invention, the common transmitter/receiver electronics and the antenna are connected in a manner that a short circuit in an antenna is converted into an open circuit at the respective terminal of the transmitter/receiver electronics. The length of the connecting line is preferably equal to one quarter of the wavelength of the selected carrier frequency of the transponder system.

The programming logic according to the invention for controlling an access terminal with a plurality of antennas is advantageously designed so that at any given time a multiplexer sequentially connects only one antenna to the transmitter/receiver electronics, with the remaining antennas being shorted or detuned. The multiplexer may actively switch the connected antennas rapidly in sequence, whereby the sequence performed by the multiplexer is halted from the time a transponder is recognized in the reception range of an antenna until the reading process is concluded.

BRIEF DESCRIPTION OF THE DRAWINGS

The invention will be described in the following a greater detail with reference to embodiments.

The drawing shows in.

DETAILED DESCRIPTION OF PREFERRED EMBODIMENTS

Figure 1:
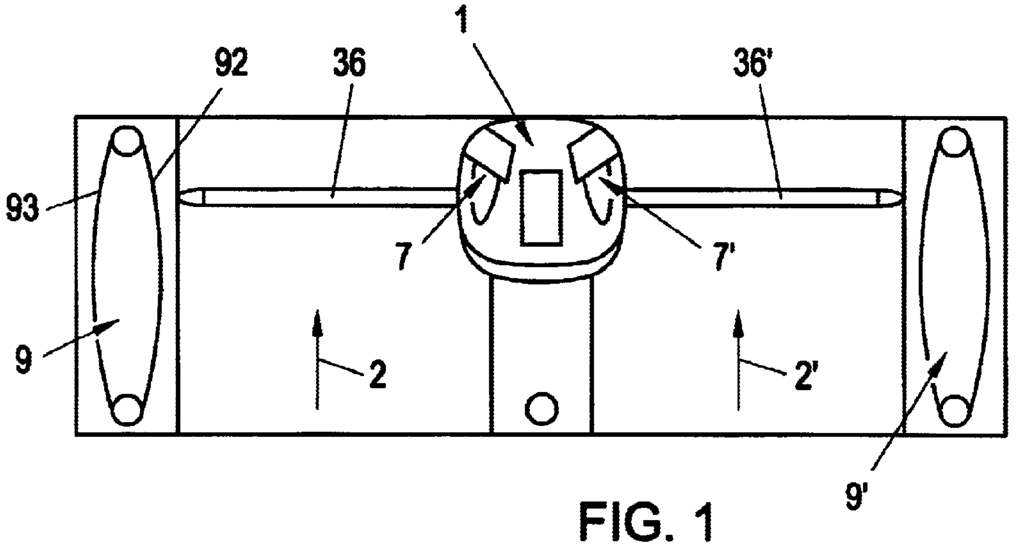
FIG. 1 a schematic illustration of an arrangement for controlling access of persons, in accordance with the present invention, depicting two access lanes.

FIG. 1 illustrates two adjacent access lanes 2 and 2', each of which has a width of, for example, 55 cm. A central control device 1 which also separates the access lanes 2, is arranged halfway between the access lanes 2. A turnstile 3 located in each access lane 2 opens when a valid access authorization is read. Antennas 9 and 9' adapted for receiving data carriers that operate with, for example, contactless chip cards without making physical contact, are located directly on both sides of the access lanes 2 and 2'. The control device 1 also includes two read heads facing the access lanes for reading conventional tickets, which may be bar code readers implemented as insertion readers 7 and 7'.

Figure 2:
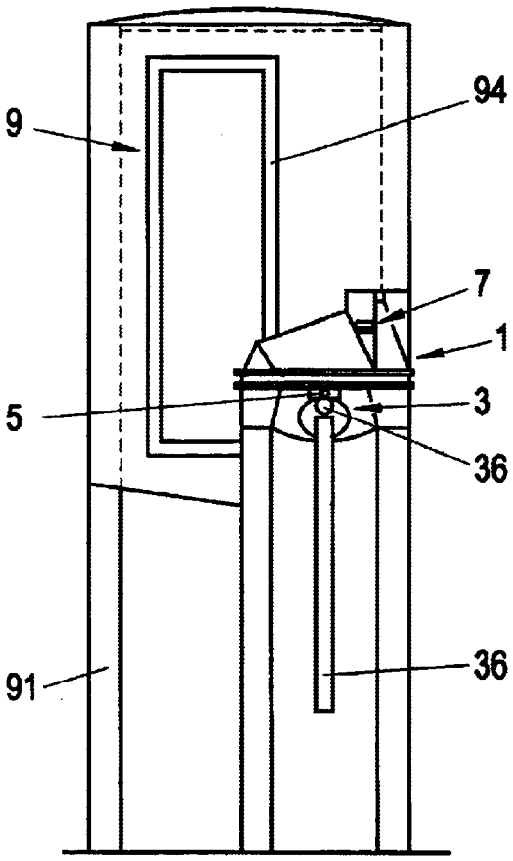
FIG. 2 a side view of an access control system.
Figure 3:
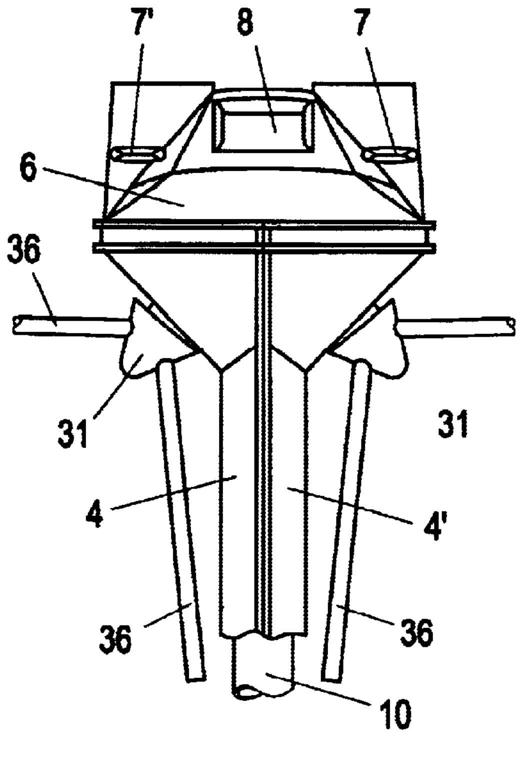
FIG. 3 a front view, on an enlarged scale, of the control device.

FIG. 2 illustrates a side view of the access control system, and FIG. 3 shows an enlarged front view of the control device 1. Two housing shells 4 and 4' made of cast aluminum form the support and also receive the two turnstiles 3 and 3' located to the left and to the right of the control device 1. A light sensor 5, which automatically releases the turnstile after reading a valid access authorization of a person wishing to pass through, is disposed in the blocking plane.

The shaft 31 of the turnstile is connected to a motor 32 through a transmission and a belt drive 34. The motor 32 includes an angular encoder 33 so that the motor can be electronically controlled. A motor force can be applied to the shaft 31 to either arrest the shaft 31 in a stop position or to release and advance the shaft 31 by the desired angular position of 180 degrees. The motor control advances the shaft 31 much more smoothly than electromagnetic brakes commonly in use. Each shaft 31 includes two rods 36 which enclose an acute angle and form relative to the rotation axis of the shaft 31an angle of 180 degrees with respect to each other. In the initial position, one of the rods 36 is positioned in a respective lane 2, blocking access to the lane. To allow a person to pass through, the shaft 31 is rotated by 180 degrees. In this rotated position, the rod 36 now points towards the ground. This feature provides optimal access and at the same time lessens the possibility for skis, a snowboard, a suitcase and the like, to become caught.

The two housing shells 4 and 4' which are made of cast aluminum, form the stand and also receive the two turnstiles 3 and 3' operating on the left and right side, respectively, of the control device 1. The stand is either securely fastened to the floor or supported for optional height-adjustment by tubes 10, for example, for winter sports. This feature has considerable advantages and is less demanding, for example, with respect to cabling, site preparation and space requirements.

The two shells 4 are terminated at the top by a third shell forming a lid 6. The lid 6 may be made of plastic and may include a central display 8 for displaying access information, for example, for displaying the ID photos associated with access authorization.

Figure 4:
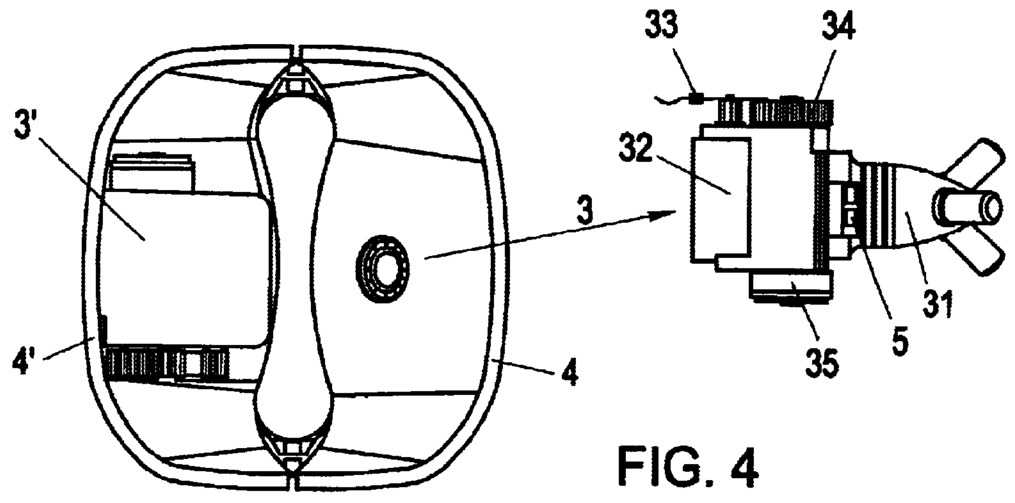
FIG. 4 a top view of an installed turnstile assembly.

FIG. 4 is a top view of an installed turnstile assembly 3' with the lid 6 removed. FIG. 4 also shows a removed turnstile assembly 3 in more detail. A shaft 31 for the blocking rods (not shown) is connected to a motor 32 through a worm gear and a belt drive 34. An angular encoder 33 is attached to the motor 32. A motor force which is controlled by a suitable electronic control, holds the blocking rods in a stop position and then releases and rotates the shaft by a desired angle. The motor control advantageously moves the shaft much more smoothly than electromagnetic brakes commonly in use. Although a brake of this type is indicated as component 35, such a brake can be replaced with a suitable controller for the motor 32.

The operation and technical features of contactless chip cards are described in more detail, for example, in the RFID handbook (Carl Hanser Publishing House, Munich Vienna). Most commonly, a card-shaped electronic ticket stores the authorization data in an EEPROM. Conventional RFID transponders operate at carrier frequencies in the range of 125 kHz and also in the range of 13.56 MHz. In many aspects, the RFID transponders operating at the higher frequency are superior to those operating at lower frequencies and, in particular, provide a higher read-out speed. When the RFID transponder is a subjected to the electromagnetic field of a respective access terminal, the data stored in the transponders may be read out and/or changed. For this purpose, the access terminal includes an antenna in the form of a conducting loop which is connected to a transmitter/receiver electronics. The antenna and the turnstile are associated with a respective access lane. Access terminals of this type without turnstiles or barriers may also be employed, for example, if the number of persons passing through is only to be counted for statistical purposes or in order to visually indicate that access is authorized. Neighboring antennas, however, may disadvantageously interfere with each other.

Figure 5:
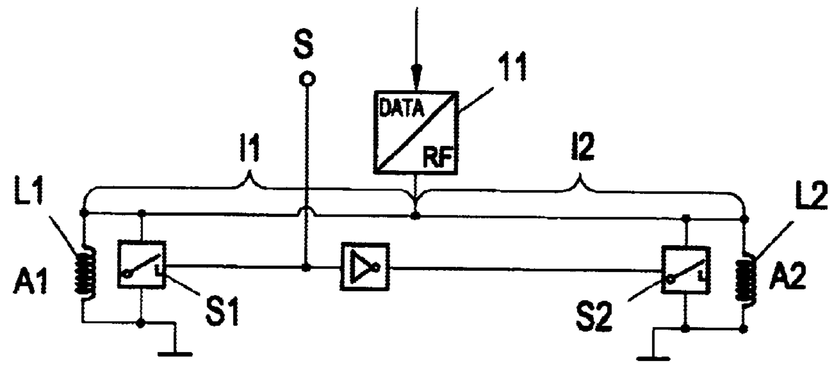
FIG. 5 a basic block diagram of a multiplexer according to the invention.

FIG. 5 shows a basic block diagram of a multiplexer according to the invention adapted to control several antennas. A transmitter/receiver electronics 11 is connected to antennas A1 and A2 via two lines l1 and l2. These antennas correspond to the antennas 9 and 9' illustrated in FIG. 1.

Each antenna A1 and A2 includes at least one coil L1 and L2. The transmitter/receiver electronics 11 produces a radio frequency field with a carrier frequency of, for example, 13.56 MHz, and transmits commands and data to RFID transponders (not shown). Examples of the basic operation of such systems are described in the references cited above.

The lines l1 and l2 are implemented as coaxial cables with a length corresponding to one quarter of the wavelength of the carrier frequency of the transponder system.

Electronic switches S1 and S2 which can be actuated via a control input S, are arranged on the lower end of the antennas A1 and A2. At any given time, the control input S can operate one of the switches S1 and S2 and activate the antenna A. The other antenna is then shorted and therefore idle. The length selected for the connecting line transforms the short-circuit into an open circuit at the common transmitter/receiver electronics since an open circuit does not affect the operation of the electronics. Consequently, a common transmitter/receiver electronics may operate any number of antennas. Since all the other antennas, with the exception of the active antenna, are shorted, these antennas do no longer interfere with each other.

The antennas are activated in rapid sequence by the control input S. When a transponder is identified, the sequence is halted until the transaction (the read/write operation) is concluded. This antenna is reactivated after the person has passed through.

Figure 6:
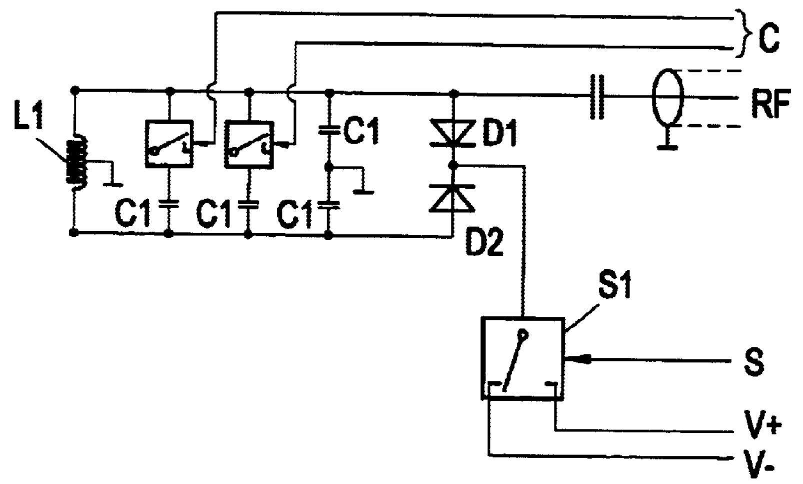
FIG. 6 is an electric circuit diagram for implementation of the antenna multiplexer.

FIG. 6 shows an implementation of the antenna multiplexer. The coil L1 of antenna A1 is tuned with the help of a capacitor C1 to a parallel-resonant circuit which is tuned to the carrier frequency. The tuning process can be automated by adding and removing capacitors from the circuit so as to prevent detuning during operation, for example due to changing environmental conditions.

Two back-to-back diodes D1 and D2 are connected in parallel to the coil L1. The center tap of the diodes can be selectively connected through an electronic switch S1 to a negative auxiliary voltage or to ground. If the diodes are connected to ground, then the coil L1 is shorted and the antenna is inactive. The respective antenna can then neither send signals to the transponders, nor can neighboring antennas excite resonances in this antenna.

If, on the other hand, the switch S1 connects the diodes D1 and D2 to a positive auxiliary voltage, then the diodes are biased in the reverse direction. The antenna A1 is then activated and can oscillate freely. The positive auxiliary voltage is preferably larger than the open-circuit voltage of the antenna so as not to impede the evaluation of a low-level data signal received from a transponder.

The invention can also be applied to systems that process information received from transponders operating at different carrier frequencies. For example, two coils which are tuned to two different frequencies, may be arranged in a single antenna support to enable migration from older transmission systems to newer technologies.

What is claimed is:

1. Apparatus for controlling access of a person passing through one of a plurality of access lanes configured for the individual passage of the person, said apparatus comprising:

a reading device associated with an access lane for access authorization of the person;

identification means for at least one of identifying the person and blocking passage of the person; and a control device arranged between two adjacent access lanes for controlling the identification means of both adjacent access lanes.

2. The apparatus of claim 1, wherein the reading device and the identification means each face a respective one of the access lanes.

3. The apparatus of claim 1, wherein the control device includes two housing shells which form a base support wherein the identification and blocking means are located in the housing shells.

4. The apparatus of claim 3, wherein the housing shells are symmetric.

5. The apparatus of claim 3, wherein the housing shells are made of cast aluminum.

6. The apparatus of claim 3, and further comprising tubes which are secured to the ground and enclosed by the housing shells, wherein a height of the control device can be adjusted by moving the housing shells along the tubes.

7. The apparatus of claim 3, wherein the control device includes a third housing shell which forms a lid to close off the two housing shells.

8. The apparatus of claim 7, wherein the lid includes reading modules for reading data disposed on tickets, with the reading modules located on the side of the control device facing the adjacent access lanes.

9. The apparatus of claim 8, wherein the reading modules each include at least one of a bar-code reader and a contactless reading coil which cooperates with the tickets having a transponder.

10. The apparatus of claim 9, wherein the bar-code reader is an insertion reader has an opening configured for insertion of a ticket.

11. The apparatus of claim 9, wherein the insertion reader has an insertion direction which is inclined with respect to a direction in which the person passes through the access lane.

12. The apparatus of claim 10, wherein the insertion direction and the direction in which the person passes through, enclose an angle of between 30 to 60 degrees.

13. The apparatus of claim 3, wherein the housing shells—when viewed from the top—have a U-shaped cross-section, with a web which is elongated towards the top, and wherein the identification and blocking means are located in an elongated region of the cross-section.

14. The apparatus of claim 1, wherein the blocking means includes a turnstile.

15. The apparatus of claim 1, wherein the identification means includes an optical scanner.

16. The apparatus of claims 1, wherein the lid includes a display arranged between the adjacent passage lanes.

17. The apparatus of claim 14, wherein the turnstile includes a shaft, the shaft defining a rotation axis forming an acute angle with an access plane and further comprising two rods that are offset by 180 degrees for blocking the access lane; said apparatus further comprising a motor for rotating the shaft, wherein one of the rods is rotated from a blocking position, in which the rod projects into the access lane, into a release position in which the one rod is oriented towards the ground.

18. The apparatus of claim 17, wherein the shaft includes a hub having threads wherein the rods are releasably screwed into the threads of the hub.

19. The apparatus of claim 17, and further comprising an electronic controller having an angular encoder for encoding the position of the shaft, wherein the shaft is held in the blocking position by a motor force controlled by the electronic controller.

20. The apparatus of claim 17, wherein the rod includes an antenna configured to receive signals transmitted by data carriers that do not require physical contact.

21. The apparatus of claim 20, wherein the antenna comprises one of a conductor loop and a conductor coil disposed in the rod.

22. Apparatus for controlling access of a person passing through one of a plurality of access lanes configured for the individual passage of the person, said apparatus comprising a reading device associated with an access lane for authorizing access of the person, said reading device including for at least each access lane an antenna adapted to receive via radio frequency fields access information stored on data carriers operating without making physical contact, said antenna including two vertical pipes which are spaced-apart in the direction of the access lane, wherein an electrically non-conducting first plate extends between the vertical pipes and a conductor loop forming a transmitter/receiver circuit is arranged behind the first plate, and a control device arranged between two adjacent access lanes and configured to receive the access information from both adjacent access lanes.

23. The apparatus of claim 22, and further comprising a second plate distal from the first plate and extending between the vertical pipes of the antenna, wherein the second plate is at least partially electrically conducting.

24. The apparatus of claim 23, wherein the distance between the first plate and the second plate is between 8 and 20 cm.

25. The apparatus of claim 22, wherein the two vertical pipes are spaced apart by a distance between 50 and 100 cm.

26. The apparatus of claim 23, wherein the second plate includes an electrically conducting mesh.

27. The apparatus of claim 22, wherein the conductor loop includes a foil which is attached to the first plate with an adhesive.

28. The apparatus of claim 23, wherein the first and second plate are clamped to sides of the vertical pipes.

29. The apparatus of claim 23, wherein the first and second plate are curved outwardly from a center of the respective plate, with an inside surface of the first plate supporting a conductor loop, and wherein the second plate includes a mesh conducting at least one of an electric and magnetic flux.

30. The apparatus of claim 22, wherein the first plate can be adjusted between a height of 80 cm and 140 cm.

31. The apparatus of claim 22, wherein each access lane includes a blocking means which can be activated by the reading device, wherein the conductor loop is arranged before the blocking means, as viewed in the direction of the access lane.

32. Apparatus for controlling access of a person passing through one of a plurality of access lanes configured for the individual passage of the person, wherein access is authorized based on data carriers operating without making physical contact with the apparatus, said apparatus comprising:

a reader associated with the access lane for checking the data carriers using radio frequency fields, wherein the reader includes at least one antenna for each access lane;

at least one of a blocking and identification means associated with the access lane; and a control device arranged halfway between two adjacent access lanes and separating the two adjacent access lanes, said control device controlling the blocking and identification means of both adjacent access lanes, wherein the antenna is arranged on a side of the access lane opposite from the control device.

* * * * *